US011663333B2

(12) United States Patent
Wang

(10) Patent No.: US 11,663,333 B2
(45) Date of Patent: May 30, 2023

(54) CLOUD-BASED SYSTEMS AND METHODS FOR DETECTING AND REMOVING ROOTKIT

(71) Applicant: Beijing DiDi Infinity Technology and Development Co., Ltd., Beijing (CN)

(72) Inventor: Yu Wang, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 457 days.

(21) Appl. No.: 16/990,957

(22) Filed: Aug. 11, 2020

(65) Prior Publication Data

US 2022/0050900 A1 Feb. 17, 2022

(51) Int. Cl.
| G06F 21/00 | (2013.01) |
| G06F 21/56 | (2013.01) |
| G06F 9/52 | (2006.01) |
| H04L 12/40 | (2006.01) |

(52) U.S. Cl.
CPC ............ *G06F 21/566* (2013.01); *G06F 9/52* (2013.01); *G06F 21/568* (2013.01); *H04L 12/40* (2013.01); *G06F 2209/521* (2013.01); *H04L 2012/40215* (2013.01); *H04L 2012/40273* (2013.01)

(58) Field of Classification Search
CPC ....... G06F 21/566; G06F 21/568; H04L 12/40
See application file for complete search history.

(56) References Cited

U.S. PATENT DOCUMENTS

2012/0102568 A1* 4/2012 Tarbotton .............. G06F 21/552
                                                                726/23
2021/0216642 A1* 7/2021 Barraza Enciso ...... G06F 40/30

FOREIGN PATENT DOCUMENTS

| WO | 2012152210 A1 | 11/2012 |
| WO | 2012152212 A1 | 11/2012 |

OTHER PUBLICATIONS

Learn the Architecture | Armv8—A Instruction Set Architecture—Arm Developer; https://developer.arm.com/architecture/earn-the-architecture/armv8-a-instruction-set-architecture/system-calls, retrieved online on Oct. 7, 2020 (7 pages).

(Continued)

*Primary Examiner* — Jeffrey C Pwu
*Assistant Examiner* — Thong P Truong
(74) *Attorney, Agent, or Firm* — Sheppard Mullin Richter & Hampton LLP

(57) ABSTRACT

An exemplary method includes: obtaining, at one or more cloud servers, endpoint data of an endpoint computing device; based on the endpoint data, determining, by the one or more cloud servers, a plurality of script-language rules, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and transmitting, by the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation.

20 Claims, 8 Drawing Sheets

(56) References Cited

OTHER PUBLICATIONS

ELoop Woo / zwhawk, A kernel rootkit with remote command and control interface for windows, https://github.com/eLoopWoo/zwhawk, retrieved online on Oct. 7, 2020 (5 pages).
Artem Baranov, GrayFish rootkit analysis | A blog about rootkits research and the Windows kernel, May 17, 2017, https://artemonsecurity.blogspot.com/2017/05/grayfish-rootkit-analysis.html, (9 pages).
SSDT Windows Kernel Rootkit, ispoleet/malware, https://github.com/ispoleet/malware/tree/master/windows%20kernel%20rootkit, retrieved online on Oct. 7, 2020 (1 page).
Negative Rings in Intel Architecture: The Security Threats That You've Probably Never Heard Of, RealWoridCyberSecurity, https://medium.com/swlh/negative-rings-in-intel-architecture-the-security-threats-youve-probably-never-heard-of-d725a4b6f831, retrieved online on Oct. 7, 2020 (20 pages).
How to Use McAfee Labs Rootkit Remover, McAfee Free Tools, https://www.mcafee.com/enterprise/en-us/downloads/free-tools/rootkitremover.html, retrieved online on Oct. 7, 2020 (6 pages).
Rootkits Defined: What They Do, How They Work, and How to Remove Them, Avast, https://www.avast.com/c-rootkit, retrieved online on Oct. 7, 2020 (16 pages).
Specifying Driver Load Order, Microsoft Docs, Apr. 20, 2017, https://docs.microsoft.com/en-US/windows-hardware/drivers/install/specifying-driver-load-order, (4 pages).
TDSSkiller, Kaspersky Labs US, https://usa.kaspersky.com/downloads/tdsskiller, retrieved online on Oct. 7, 2020 (7 pages).
Virus Total, https://www.virustotal.com/gui/file/8279a25552bd9e003dface0967981efbf8b0d5c6894fb81e733636a7ad524744/detection, retrieved online on Oct. 7, 2020 (2 pages).

* cited by examiner

410 

412: obtaining, at one or more cloud servers, endpoint data of an endpoint computing device

414: based on the endpoint data, determining, by the one or more cloud servers, a plurality of script-language rules, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit

416: transmitting, by the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation

422: transmitting, by an endpoint computing device, endpoint data to one or more cloud servers

424: receiving, at the endpoint computing device from the one or more cloud servers, a plurality of script-language rules corresponding to the endpoint data, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit

426: executing, at the endpoint computing device, the set of rootkit rules to detect and/or remove the target rootkit by, for each of the set of rootkit rules, executing a corresponding atomic operation

FIG. 4B

CLOUD-BASED SYSTEMS AND METHODS FOR DETECTING AND REMOVING ROOTKIT

TECHNICAL FIELD

The disclosure relates generally to cloud-based systems and methods for detecting and/or removing rootkit.

BACKGROUND

Rootkit refers to a collection of computer software, typically malicious, designed to enable access to a computer or an area of its software that is not otherwise allowed and often masks its existence or the existence of other software. For example, a rootkit may enable an unauthorized user to gain control of a computer system without being detected.

Rootkit installation can be automated, or an attacker can install it after having obtained root or Administrator access. Obtaining this access is a result of a direct attack on a system, e.g., exploiting a known vulnerability (such as privilege escalation) or a password (obtained by cracking or social engineering tactics like "phishing"). Once installed, it becomes possible to hide the intrusion of the rootkit as well as to maintain privileged access. Full control over a system means that existing software can be modified, including software that might otherwise be used to detect or circumvent rootkits.

Rootkit detection is difficult because a rootkit may be able to subvert the software that is intended to find it. Removal can be complicated or practically impossible without reinstallation, especially in cases where the rootkit resides in the kernel. Usually, the detection engine and the malicious behavior interception module of the endpoint anti-virus software work in a high-privilege state, and most of these modules are presented in the form of vendor drivers or third-party kernel extensions. In modern computer operating systems, privilege levels are roughly divided into "high privileges" and "low privileges," where Ring 0 means high privilege (system privilege), and Ring 3 means low privilege (user privilege). Rootkits may carry kernel driver components, and in such cases, anti-virus software (e.g., using an alternative and trusted operating system, behavioral-based methods, signature scanning, difference scanning, and memory dump analysis) and rootkits have the same system permissions and manipulation capabilities.

As a result, rootkits are extremely difficult to detect. Anti-virus software cannot ensure that it has the ability to identify the existence of rootkits, because rootkits can interfere with and/or prevent the scanning process using means such as access redirection. In addition, rootkits are extremely difficult to remove. Anti-virus software cannot ensure that it has the ability to remove rootkits that have already been detected, because rootkits can use the write-back recovery, access denial, or the like to interfere with and/or block the cleanup process.

Further, due to the uniqueness of rootkits, the anti-rootkit engine is usually rootkit-specific. Anti-virus vendors mostly use separate removal tools to deal with different rootkits. But under this approach, users need to have enough experience to identify which specific rootkit has infected the computer, in order to obtain specific anti-virus tools targeting such rootkit. Some other vendors may port rootkit detection and removal code to endpoint anti-virus software. However, this causes instability and hysteresis. If the anti-rootkit feature is enabled for each user in the endpoint anti-virus software, the system instability will be significantly increased. Any error in the high privilege mode will cause system crash or Blue Screen of Death (BSoD). This can be fatal if the computing system is deployed in autonomous vehicles. As to hysteresis, as the rootkit detection and removal process is rootkit-specific, the files that are pushed to end users for update will no longer be a sample signature database, but rather the binary code itself. Due to the long tail effect, the code takes effect much slower than the signature rules. For example, some users simply do not regularly update their computing devices. Further, the driver/kernel-mode code needs to be restarted to take effect. This causes problems in server systems, because they rarely restart. For another example, if a system restores to a previous checkpoint, the pushed code will be lost.

Therefore, to improve endpoint security, it is desirable to provide new anti-rootkit solutions that balance ease of use, accuracy, real-time operability, and stability.

SUMMARY

Various embodiments of the specification include, but are not limited to, cloud-based systems, methods, and non-transitory computer readable media for detecting and removing rootkit.

In some embodiments, a computer-implemented method comprises obtaining, at one or more cloud servers, endpoint data of an endpoint computing device; based on the endpoint data, determining, by the one or more cloud servers, a plurality of script-language rules, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and transmitting, by the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation.

In one embodiment, the endpoint data comprises one or more of: a driver binary file of a driver of the endpoint computing device; information of a process of the endpoint computing device; a version of a driver of the endpoint computing device; and a version of an operating system of the endpoint computing device.

In one embodiment, the at least one rootkit comprises a different target rootkit; the plurality of script-language rules comprise a different set of one or more rootkit rules corresponding to the different target rootkit; and the different set of rootkit rules is executable at the endpoint computing device to detect and/or remove the different target rootkit by, for each of the different set of rootkit rules, executing a corresponding atomic operation.

In one embodiment, the set of rootkit rules comprises one or more first rules for detecting the target rootkit and one or more second rules for removing the target rootkit; transmitting, by the one or more cloud servers to the endpoint computing device, the plurality of script-language rules comprises: transmitting, by the one or more cloud servers, the one or more first rules to the endpoint computing device, obtaining, by the one or more cloud servers from the endpoint computing device, a positive result of detecting the target rootkit in the endpoint computing device, and transmitting, by the one or more cloud servers, the one or more second rules to the endpoint computing device; and the method further comprises receiving, at the one or more cloud servers, a message of successful removal of the target rootkit from the endpoint computing device.

In one embodiment, the method further comprises: storing, at the endpoint computing device, the first and second rules; parsing, at the endpoint computing device, the first and second rules; and detecting and removing, at the endpoint computing device, the target rootkit by executing the first and second rules, wherein the execution of the first and second rules triggers first and second rule handlers corresponding to the first and second rules to execute a plurality of atomic operations respectively corresponding to the first and second rules.

In one embodiment, transmitting, by the one or more cloud servers to the endpoint computing device, the plurality of script-language rules comprises: transmitting, by the one or more cloud servers, the plurality of script-language rules to a driver module of the endpoint computing device, wherein the driver module corresponds to a hardware abstraction layer that has a privilege level no lower than a privilege level of the target rootkit.

In one embodiment, the hardware abstraction layer is a kernel-mode driver or a hypervisor handler.

In one embodiment, the method further comprises transmitting, by the one or more cloud servers, an updated rootkit rule to the endpoint computing device to obtain an updated set of rootkit rules by updating at least one of the set of rootkit rules, wherein the updated set of rootkit rules is executable at the endpoint computing device to detect and/or remove the target rootkit by, for each of the updated set of rootkit rules, executing a corresponding atomic operation.

In one embodiment, the method further comprises: determining, by the one or more cloud servers, the target rootkit based on the endpoint data; selecting, by the one or more cloud servers from multiple rules stored in a cloud database, the plurality of script-language rules; and generating, by the one or more cloud servers, a computer program based on the target rootkit, wherein the set of rootkit rules comprises the computer program, and the computer program is configured to trigger the corresponding atomic operation for each of the set of rootkit rules.

In one embodiment, the endpoint computing device comprises a vehicle-based computing device and a Controlled Area Network (CAN-bus) coupled to the vehicle-based computing device; the endpoint data comprises CAN-bus data; and the atomic operation of detecting and/or removing the at least one rootkit comprises an atomic operation of detecting whether the target rootkit has access to the CAN-bus.

In one embodiment, the endpoint computing device comprises a vehicle-based computing device and a Controlled Area Network (CAN-bus) coupled to the vehicle-based computing device; the endpoint data comprises CAN-bus data; and the set of rootkit rules is executable to detect whether the target rootkit has access to the CAN-bus based on the CAN-bus data or to block the access.

In one embodiment, the endpoint computing device comprises a vehicle-based computing device and an infotainment system coupled to the vehicle-based computing device; the endpoint data comprises infotainment data; and the set of rootkit rules is executable to detect whether the target rootkit has access to the infotainment system based on the infotainment data or to block the access.

In one embodiment, the endpoint computing device comprises a vehicle-based computing device and a telematics box coupled to the vehicle-based computing device; the endpoint data comprises telematics data; and the set of rootkit rules is executable to detect whether the target rootkit has access to the telematics box based on the telematics data or to block the access.

In some embodiments, a non-transitory computer-readable storage medium stores instructions executable by one or more processors, wherein execution of the instructions causes the one or more processors to perform operations comprising: obtaining, at one or more cloud servers, endpoint data of an endpoint computing device; based on the endpoint data, determining, by the one or more cloud servers, a plurality of script-language rules, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and transmitting, by the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation.

In some embodiments, a system comprises one or more processors and one or more non-transitory computer-readable memories coupled to the one or more processors and configured with instructions executable by the one or more processors to cause the system to perform operations comprising: obtaining, at one or more cloud servers, endpoint data of an endpoint computing device; based on the endpoint data, determining, by the one or more cloud servers, a plurality of script-language rules, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and transmitting, by the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation.

In some embodiments, a computer-implemented method comprises transmitting, by an endpoint computing device, endpoint data to one or more cloud servers; receiving, at the endpoint computing device from the one or more cloud servers, a plurality of script-language rules corresponding to the endpoint data, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and executing, at the endpoint computing device, the set of rootkit rules to detect and/or remove the target rootkit by, for each of the set of rootkit rules, executing a corresponding atomic operation.

In one embodiment, the at least one rootkit comprises a different target rootkit; the plurality of script-language rules comprise a different set of one or more rootkit rules corresponding to the different target rootkit; and the method further comprises: executing, at the endpoint computing device, the different set of rootkit rules to detect and/or remove the different target rootkit by, for each of the different set of rootkit rules, executing a corresponding atomic operation.

In one embodiment, the set of rootkit rules comprises one or more first rules for detecting the target rootkit and one or more second rules for removing the target rootkit; and executing, at the endpoint computing device, the set of rootkit rules to detect and/or remove the target rootkit by, for each of the set of rootkit rules, executing the corresponding atomic operation comprises: receiving, at the endpoint computing device from the one or more cloud servers, the one or more first rules; executing, at the endpoint computing device, the one or more first rules to detect the target rootkit by, for each of the one or more first rules, executing a corresponding atomic operation; transmitting, by the endpoint computing device to the one or more cloud servers, a positive result indicating detection of the target rootkit; receiving, at the endpoint computing device from the one or more cloud servers, the one or more second rules; and executing, at the endpoint computing device, the one or more second rules to remove the target rootkit by, for each of the one or more second rules, executing a corresponding atomic operation.

In one embodiment, executing the set of rootkit rules to detect and/or the target rootkit comprises: parsing, at the endpoint computing device, the first and second rules; and detecting and removing, at the endpoint computing device, the target rootkit by executing the first and second rules, wherein the execution of the first and second rules triggers first and second rule handlers corresponding to the first and second rules to execute a plurality of atomic operations respectively corresponding to the first and second rules.

In one embodiment, receiving, at the endpoint computing device from the one or more cloud servers, the plurality of script-language rules corresponding to the endpoint data comprises: storing, at the endpoint computing device, the plurality of script-language rules corresponding to the endpoint data to a driver module of the endpoint computing device, wherein the driver module corresponds to a hardware abstraction layer that has a privilege level no lower than a privilege level of the target rootkit.

In one embodiment, the method further comprises receiving, at the endpoint computing device from the one or more cloud servers, an updated rootkit rule; and updating, at the endpoint computing device, at least one of the set of rootkit rules to obtain an updated set of rootkit rules, wherein the updated set of rootkit rules is executable at the endpoint computing device to detect and/or remove the target rootkit by, for each of the updated set of rootkit rules, executing a corresponding atomic operation.

In one embodiment, before receiving the set of rootkit rules, the method further comprises: determining, by the one or more cloud servers, the target rootkit based on the endpoint data; selecting, by the one or more cloud servers from multiple rules stored in a cloud database, the plurality of script-language rules; generating, by the one or more cloud servers, a computer program based on the target rootkit, wherein the set of rootkit rules comprises the computer program, and the computer program is configured to trigger the corresponding atomic operation for each of the set of rootkit rules; and transmitting, by the one or more cloud servers to the endpoint computing device, the plurality of script-language rules.

In some embodiments, a non-transitory computer-readable storage medium stores instructions executable by one or more processors, wherein execution of the instructions causes the one or more processors to perform operations comprising: transmitting, by an endpoint computing device, endpoint data to one or more cloud servers; receiving, at the endpoint computing device from the one or more cloud servers, a plurality of script-language rules corresponding to the endpoint data, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and executing, at the endpoint computing device, the set of rootkit rules to detect and/or remove the target rootkit by, for each of the set of rootkit rules, executing a corresponding atomic operation.

In some embodiments, a system comprises one or more processors and one or more non-transitory computer-readable memories coupled to the one or more processors and configured with instructions executable by the one or more processors to cause the system to perform operations comprising: transmitting, by an endpoint computing device, endpoint data to one or more cloud servers; receiving, at the endpoint computing device from the one or more cloud servers, a plurality of script-language rules corresponding to the endpoint data, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and executing, at the endpoint computing device, the set of rootkit rules to detect and/or remove the target rootkit by, for each of the set of rootkit rules, executing a corresponding atomic operation.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the specification. It is to be understood that the foregoing general description and the following detailed description are exemplary and explanatory only, and are not restrictive of the specification, as claimed.

BRIEF DESCRIPTION OF THE DRAWINGS

Non-limiting embodiments of the specification may be more readily understood by referring to the accompanying drawings in which:

FIG. 4A illustrates a flowchart of an exemplary method for detecting and/or removing rootkit, in accordance with various embodiments.

FIG. 4B illustrates a flowchart of an exemplary method for detecting and/or removing rootkit, in accordance with various embodiments.

DETAILED DESCRIPTION

Figure 1:
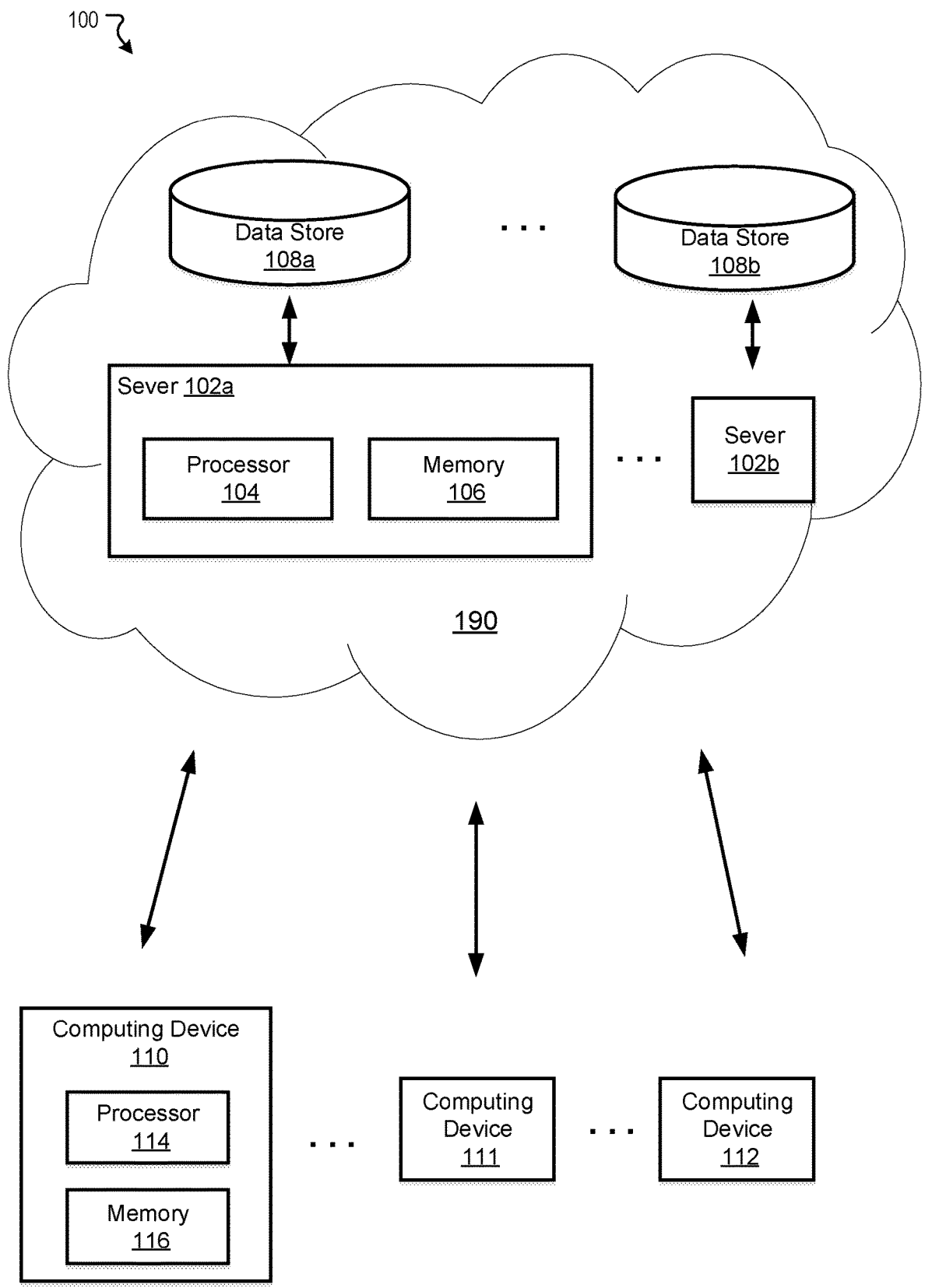
FIG. 1 illustrates an exemplary environment for detecting and/or removing rootkit, in accordance with various embodiments of the disclosure.

Non-limiting embodiments of the present specification will now be described with reference to the drawings. Particular features and aspects of any embodiment disclosed herein may be used and/or combined with particular features and aspects of any other embodiment disclosed herein. Such embodiments are by way of example and are merely illustrative of a small number of embodiments within the scope of the present specification. Various changes and modifications obvious to one skilled in the art to which the present specification pertains are deemed to be within the spirit, scope and contemplation of the present specification as further defined in the appended claims.

To at least mitigate the problems set forth in the background section above, cloud-based systems and methods for detecting and/or removing rootkit are provided. Embodiments disclosed herein have one or more technical effects. In some embodiments, rootkit detection and removal actions are abstracted into a set of atomic operations, such that the task of detecting or removing a target rootkit can break down to one or more specific rootkit detection or removal actions. Thus, a combination of rules may be selected from a pool of rules and organized into a computer program, the execution of which may detect and/or remove a corresponding rootkit. Different combinations of the rules can be selected to detect or remove different rootkits. By atomizing actions, scripting rules, and cloud distribution, fine-grained and real-time rootkit detection and cleanup may be achieved.

In some embodiments, discretizing rootkit detection or removal into individual rules improves computer functionality by reducing the overall computing burden as one rule may be used in the detection or removal operation of different rootkits. Thus, the files to be updated to endpoint computing devices are no longer binary code, but a set of script rules, which allow quick patch-up to counter the latest version of rootkits. The update frequency is significantly reduced, which is more favorable to devices (e.g., servers) that run on continuous system operation. This therefore improves computer functionality.

In some embodiments, atomic operations corresponding to the rules may be obtained from the cloud and integrated into the endpoint user devices for triggering. Thus, the process of rootkit detection and removal is streamlined as the process can be automated and through interactions between cloud servers and the endpoint computing devices.

In some embodiments, to detect and/or remove a specific rootkit, one or more rules (e.g., script-language rules) may be specially selected and organized into a rule combination by adding trigger conditions. Thus, the selected rule combination may be provided in the form of a computer program in a script language (e.g., Python, Lua, XML, or another script language). Execution of the computer program may execute corresponding atomic operations to target detection and/or removal of the specific rootkit. This allows case-by-case solution to rootkit detection/removal with specificity to different rootkits.

In some embodiments, the plurality of rules (e.g., script-language rules) may be assembled into a cross-platform program (e.g., a computer program). Platform may refer to operation system or another computing environment. Each of the plurality of rules may correspond to an execution condition for executing the corresponding atomic operation. For example, the program may comprise a first portion executable if the operation system is Windows and a second portion executable if the operation system is iOS. Thus, the same program can be deployed on computing devices running on Windows or iOS operation system, while the corresponding portion of program may be executed accordingly to achieve rootkit detection and/or removal. In some embodiments, the cross-platform program may be implemented with interpreted programing languages such as Java Script, Perl, Python, etc. The programs or applications developed with such interpreted programing languages may be directly executed without compilation. In some embodiments, when an endpoint computing device receives and executes the cross-platform program, it may first be asked to determine a type and/or a version of the platform it is running on, and then execute the portion of the program corresponding to its platform. In some other embodiments, the cloud servers may proactively determine the platform of an endpoint computing device, and send the portion of the program that matches the platform to the endpoint computing device for execution.

In some embodiments, the rule set may be stored on the cloud servers, and the servers may issue different anti-rootkit rules and different anti-rootkit rule sets to different endpoint computing devices. Thus, by maintaining the rule set and applying rules from the rule set, different existing and new rootkits may be detected and/or removed.

In some embodiments, when receiving the computer program, a policy parser of the endpoint computing device may parse the script and instruct the agent driver (e.g., the kernel-mode driver described below) of the endpoint computing device to find and remove the rootkit. That is, a hardware architecture layer (e.g., agent interface layer) with low privilege may parse and store rules, and may be protected by a hardware architecture layer (e.g., kernel-mode driver) with high privilege. Although the descriptions use Windows as an example (for example, in terms of the user-mode agent and kernel-mode agent architecture), the disclosed systems and methods may apply to any Operating System platform, such as Windows, Linux, macOS, iOS, Android, etc.

In some embodiments, the agent interface layer may perform data collection and manual intervention through interfaces such as remote intervention. Data collection may provide effective feedback to the cloud and allow the cloud to made effective determination of the potential target rootkit to detect/remove. Manual intervention provides important safety assurance. For example, when the endpoint computing device is deployed on a vehicle, the remote intervention may prevent unsafe operation (e.g., rule update may be halted when the vehicle is moving).

FIG. 1 illustrates an exemplary environment 100 for detecting and/or removing rootkit, in accordance with various embodiments. The exemplary environment 100 may include a computing system 190 and one or more computing devices (e.g., a client device, desktop, laptop, smartphone, tablet, mobile device) such as computing devices 110, 111, and 112. In some embodiments, the computing system 190 may be implemented as a cloud-based system, and the computing devices 110, 111, and 112 may couple to the cloud-based system. The computing system 190 may utilize cloud computing. Cloud computing refers to the provision of computational resources via a computer network. In a traditional model of computing, both data and software are fully contained on a user's computer. In a cloud computing arrangement, however, the user's computer may contain relatively little software or data (e.g., a minimal operating system and web browser), and may serve as a display terminal for processes occurring on a network of computers. One common shorthand term used to describe a cloud computing system or service (or even an aggregation of cloud services) is "the cloud."

Cloud computing is sometimes referred to as "client-server computing." However, there are distinctions between cloud computing and general client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients such that a one-to-one relationship or connection may not be required. Thus, cloud computing generally includes client-server computing along with additional services and functionality.

In some embodiments, cloud computing may free users from certain hardware and software installation and maintenance tasks through the use of simplified hardware on the user's computer. For example, the rules (e.g., the script-language rules including the computer program) for detecting and/or removing rootkit may be maintained, updated, and delivered from the cloud, such that the user is freed from these tasks. Also, because the user's computer can access a vast network of computing resources (e.g., processors, disk drives, etc.), the user is not limited just to the computing and storage power of his or her local computer. Additionally, the sharing of computing resources across many users may reduce computing costs to individuals. For example, multiple computers connected to the cloud may be able to share the same pool of computing power, storage capacity, applications, and files. Users can store and access personal files on a remote server rather than physically carrying around a storage medium.

In some embodiments, the computing system 190 comprises one or more servers (e.g., 102a, 102b) and one or more data stores (e.g., 108a, 108b). The one or more servers and the one or more computing devices may each include one or more processors and one or more memories (e.g., permanent memory, temporary memory, non-transitory computer-readable memory). For example, the server 102a may include a processor 104 and a memory 106, and the computing device 110 may include a processor 114 and a memory 116. The processor(s) may be configured to perform various operations by interpreting machine-readable instructions stored in the memory. The computing system 190 may include other computing resources or have access (e.g., via one or more connections/networks) to other computing resources.

The data store may include an electronic storage. The electronic storage may refer to a device for storing information, such as electronic communications in any channel, group project work product (e.g., documents), etc. The electronic storage may include one or more storage media in which information may be stored. For example, the electronic storage may include optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), or other electronically readable storage media. The electronic storage may be part of the computing device (e.g., integrated into the computing device) or removably coupled to the computing device.

In some embodiments, a user of the computing device 110 may open a web browser and connect to a host of servers of the computing system 190 that run user interface software configured to collect commands from the user and interpret the commands into commands on the servers. The servers may handle the computing, and may store data to the data stores, retrieve data from the data stores, and/or deliver data to the computing device 110. Through "cloud computing," data across multiple servers and/or data stores may be synchronized around the world allowing for collaborative work on one file or project from multiple users around the world.

In some embodiments, the one or more servers may include one or more modules described below with reference to FIG. 5A, and the computing device 110 may include one or more modules described below with reference to FIG. 5B. In one embodiment, each module may include instructions stored in a non-transitory computer-readable storage medium. When the instructions are executed by a processor, the server or computing device may be caused to perform steps described below. The various modules may be implemented in hardware (e.g., artificial intelligence chip specialized for detecting and/or removing rootkit) and/or software (e.g., rootkit detecting and/or removing software).

While the servers, data stores, and the computing devices are shown in FIG. 1 as single entities, this is merely for ease of reference and is not meant to be limiting. One or more components or functionalities of the computing system 190 or the computing devices described herein may be implemented in a single computing device or multiple computing devices. For example, one or more functionalities of the computing system 190 may be implemented in the servers 102a and 102b or distributed across multiple servers and data stores. For instance, the computing system 190 may be a part of a computing platform, such as a vehicle hailing platform. A ride-hailing platform can automatically connect users requesting transportation services ("service requesters") with users providing transportation services ("service providers"). Each service requester or passenger pays for using the transportation services, while each service provider or vehicle driver receives compensation for providing the transportation services. The functionalities of the computing system 190 may be implemented via the computing platform to server the computing devices.

Figure 2:
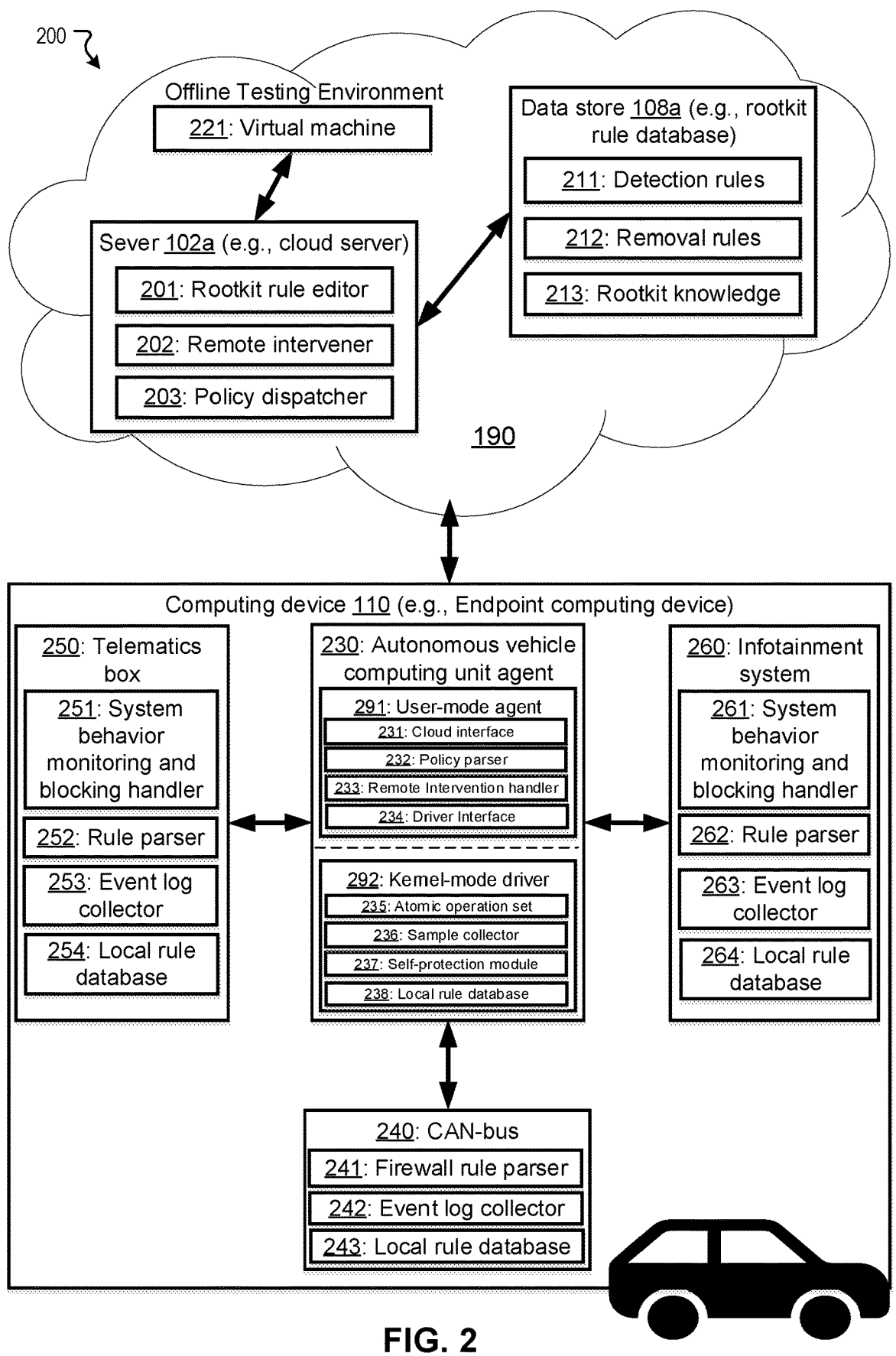
FIG. 2 illustrates an exemplary system for detecting and/or removing rootkit, in accordance with various embodiments of the disclosure.

FIG. 2 illustrates an exemplary system 200 for detecting and/or removing rootkit, in accordance with various embodiments of the disclosure. The components illustrated in FIG. 2 are merely exemplary, and there may be more or fewer components as shown. The various components may be implemented as hardware (e.g., processor, signal transmitter) and/or software modules. System 200 may be an example of the environment 100.

In some embodiments, the computing system 190 may include one or more servers (e.g., 102a which may be referred to, for example, as cloud server, cloud server cluster), coupled to one or more data stores (e.g., 108a which may be referred to, for example, as rootkit rule database or cloud database) and one or more virtual machines (e.g., 221). The virtual machine 221 may be used for implementing offline testing of rootkit detection and/or removal. The server 102a may include a rootkit rule editor 201, a remote intervener 202, and a policy dispatcher 203. The rootkit rule editor 201 may be configured to edit rules, such as script-language rules for detecting/removing rootkit. The remote intervener 202 may be configured to push data to a computing device to achieve remote intervention. For example, if a computing device is deployed on a vehicle and the vehicle is moving in an autonomous driving mode, the remote intervener 202 may push instructions to halt rule update on the computing device to ensure safety and avoid disruption to the vehicle operation. The policy dispatcher 203 may be configured to push rules (e.g., the script-language rules including the computer program) to various computing devices, or allow computing devices to obtain rules (e.g., the script-language rules including the computer program) from it. The data store 108a may be configured to store one or more rootkit detection rules 211, one or more rootkit removal rules 212, rootkit knowledge 213 (e.g., rootkit samples, endpoint data collected from endpoint computing devices), etc.

In some embodiments, the computing device 110 may be referred to as an endpoint computing device. The computing device 110 may include, for example, server, desktop, laptop, mobile phone, pad, wearable device, in-vehicle computer, etc. In FIG. 2, the computing device 110 illustrates an example of a vehicle-based endpoint computing device. The communication between the vehicle-based endpoint computing device and the cloud may include wired (e.g., cable) and wireless communications (e.g., 5G, Bluetooth).

In some embodiments, the computing device 110 may include an autonomous vehicle computing unit agent 230 (e.g., vehicle on-board computer) coupled to a Controlled Area Network (CAN-bus) 240, a telematics box (T-box) 250, and an infotainment system 260. In one embodiment, autonomous vehicles may include vehicles with autonomous control systems guide vehicles (e.g., automobiles, trucks, vans) without direct guidance by human operators. Autonomous control systems may analyze the surrounding physical environment in various ways to guide vehicles in a safe manner. For example, an autonomous control system may detect and/or track objects (e.g., obstacles, lane marks, traffic signs) in the physical environment, and responsive to a detected object, guide the vehicle in a specific movement that avoid obstacles and comply with traffic rules.

In some embodiments, the autonomous vehicle computing unit agent 230 may include various hardware abstraction layers with different privileges. For example, the autonomous vehicle computing unit agent 230, if based on a Windows Operating System, may include a user-mode agent 291 (e.g., an interface module corresponding to authorization level Ring 3) and a kernel-mode driver 292 (e.g., an interface module corresponding to authorization level Ring 0). In Windows (and most modern operating systems), there is a distinction between code that is running in the "user mode," and code that is running in the "kernel mode." This is because Intel CPUs have modes of operation called rings that specify the type of instructions and memory available to the running code. There are four rings: Ring 0 (also known as kernel mode) has full access to every resource, and is the mode in which the Windows kernel runs; Rings 1 and 2 can be customized with levels of access but are generally unused unless there are virtual machines running; and Ring 3 (also known as user mode) has restricted access to resources. The reason for this is because if all programs run in kernel mode, they would be able to overwrite each other's memory and possibly bring down the entire system when they crash. With the development of technology, Intel and other manufacturers may expand the privilege model for the CPU architecture. In one example, the privilege level may be extended to Ring −3 as shown below, where the privilege level increases with a lower Ring number:

Ring 3: Running user Applications (Lowest Privilege)
Ring 2: Device Drivers
Ring 1: Device Drivers
Ring 0: Kernel (Higher Privilege than Ring 1-Ring 3)
Ring −1: Hypervisor
Ring −2: Intel System Management Mode (Intel SMM)
Ring −3: Intel Management Engine (Intel ME)

Therefore, the various components and functions of the Kernel-mode Driver may be alternatively implemented in Hypervisor, Intel SMM, Intel ME, or another hardware abstraction layer with a higher privilege.

Alternatively, different manufacturers may apply different names to the abstraction layers. For example, the Advanced RISC Machine (ARM) architecture has its own privilege definitions, such as EL0, EL1, EL2, EL3, similar to Ring 3, Ring 2, Ring 1, Ring 0 above. A person of ordinary skill in the art would be able to apply the disclosed systems and methods to such alternative hardware privilege architectures.

In some embodiments, the user-mode agent 291 may include: a cloud interface 231 (e.g., an uplink/downlink interface layer of the cloud service) configured to interface with the computing system 190, a policy parser 232 configured to parse rules obtained from the computing system 190, a remote intervention handler 233 configured to trigger operations through the user-mode agent 291 based on instructions from the remote intervener 202, and a driver interface 234 (e.g., an uplink/downlink interface layer of the agent-driver) configured to interface with the kernel-mode driver 292. In some embodiments, the user-mode agent 291 may be optional, and the kernel-mode driver 292 may directly interface with the computing system 190 (that is, the cloud).

In some embodiments, the kernel-mode driver 292 may include: an atomic operation set 235 configured to store atomic operations corresponding to rules, a sample collector 236 configured to collect samples from the computing device 110 for uploading to the computing system 190, a self-protection module 237 configured to protect the various anti-rootkit components from removal or disruption by anti-rootkits, and a local rule database 238 configured to store rules. Rules obtained from the computing system 190, after being parsed at the user-mode agent 291, may be stored at the user-mode agent 291 or the kernel-mode driver 292. In some embodiments, the rules may be stored at the user-mode agent 291 and protected by the self-protection module 237 (e.g., prevented from being opened or accessed by rootkits). This architecture may improve security of the rules, since the policy parser 232 is at the user-mode agent 291 and is most likely open-source (that is, less secure). For example, if the rules are written in XML python at the cloud, and the user-mode agent 291 uses XML/python parser to parse and rules. Installing the XML/python parser in the kernel may create stability and security issues, because XML/python parser may be created by $3^{rd}$ party and not trustworthy.

In some embodiments, the autonomous vehicle computing unit agent 230 may be linked with the CAN-Bus 240 to monitor and/or block malicious CAN data streams by dispatching firewall rules. The CAN-bus 240 may include: a firewall rule parser 241 configured to parse CAN-bus firewall rules (e.g., rules for detecting and/or removing rootkit in CAN-bus), an event log collector 242 configured to log CAN-bus events, and a local rule database 243 configured to store CAN-bus rules.

In some embodiments, the autonomous vehicle computing unit agent 230 may be linked with the T-box 250 to monitor and/or block the abnormal behavior of the T-box 250 by dispatching T-box rules (e.g., rules for discovering and blocking abnormal or malicious inbound/outbound network connections existing in the T-box 250). The telematics box (T-box) 250 may include: a system behavior monitoring and blocking handler 251 configured to monitor the behavior of the T-box 250 and block suspicious operations, a rule parser 252 configured to parse T-box rules (e.g., rules for detecting and/or removing rootkit in T-box), an event log collector 253 configured to log T-box events, and a local rule database 254 configured to store T-box rules. The T-box 250 may be deployed in the vehicle or a roadside device communicative with the rest of the computing device 110 through 5G or other communication channels.

In some embodiments, the autonomous vehicle computing unit agent 230 may be linked with the infotainment system 260 to monitor and/or block the abnormal behavior of the infotainment system 260 by dispatching infotainment system rules (e.g., rules for discovering and blocking abnormal or malicious inbound/outbound network connections existing in the infotainment system 260). The infotainment system 260 may include: a system behavior monitoring and blocking handler 261 configured to monitor the behavior of the infotainment system 260 and block suspicious operations, a rule parser 262 configured to parse infotainment system rules (e.g., rules for detecting and/or removing rootkit in the infotainment system), an event log collector 263 configured to log infotainment events, and a local rule database 264 configured to store infotainment system rules.

In some embodiments, rootkit detection and removal actions are abstracted into a set of atomic operations, such that the task of detecting or removing each target rootkit can break down to a set of one or more specific rootkit detection or removal operations. Each set may characterize a rootkit. And the collection of operations may directly determine the capabilities of the anti-rootkit engine (e.g., how many rootkits can be detected/removed, whether rootkit variations can be detected/removed, etc.). The anti-rootkit engine may refer to various hardware and/or software modules on the cloud and on the endpoint for rootkit detection and/or removal.

For example, in a Windows platform, the atomic operation set may include six types of atomic operations: 1. File operations, 2. Process and Thread operations, 3. Registry operations, 4. Network operations, 5. Kernel module operations, and 6. Other operations. For example, atomic operations under the registry operations category may edit the registry to achieve rootkit removal. Among them, file operations, process and thread operations, registry operations, and network operations are applicable to malware in both Ring 3 and Ring 0. Kernel module operations and other operations may be specifically anti-rootkit (e.g., for detecting and/or removing rootkit), since rootkits often infect the kernel of the computer. The file operations, process and thread operations, registry operations and network operations may help the anti-rootkit engine obtain trusted information in a complex endpoint environment. That is, regardless of how the rootkits hide from detection or interfere with or resist detection/removal, this set of actions may detect and operate files, processes, and threads, registry items (e.g., keys and values), and network ports that are maliciously hidden and/or protected.

In some embodiments, the file operations may include but are not limited to the following atomic actions: 1.1. CreateFile/OpenFile; 1.2. ReadFile; 1.3. WriteFile; 1.4. QueryFileInformation (File attributes); 1.5. SetFileInformation (File attributes); 1.6. QueryDirectory; 1.7. UnlockFile; 1.8. DeleteFile; 1.9. FileCertificateVerification.

In some embodiments, the process and thread operations may include but are not limited to the following atomic actions: 2.1. CreateProcess/OpenProcess; 2.2. QueryProcessInformation (Process attributes); 2.3. SetProcessInformation (Process attributes); 2.4. EnumProcesses ("Enum" stands for Enumerate); 2.5. TerminateProcess; 2.6. EnumDynamicLibrary; 2.7. UnloadDynamicLibrary; 2.8. CreateThread/OpenThread; 2.9. QueryThreadInformation (Thread attributes); 2.10. SetThreadInformation (Thread attributes); 2.11. EnumThread; 2.12. TerminateThread.

In some embodiments, the registry operations may include but are not limited to the following atomic actions: 3.1. CreateKey/OpenKey; 3.2. QueryValueKey; 3.3. SetValueKey; 3.4. EnumKey; 3.5. EnumValueKey; 3.6. DeleteKey; 3.7. DeleteValueKey.

In some embodiments, the network operations may include but are not limited to the following atomic actions: 4.1. EnumPort; 4.2. EnumConnection; 4.3. CloseConnection.

In some embodiments, the kernel module operations may include but are not limited to the following atomic actions: 5.1. LoadDriver (e.g., blocking data stream); 5.2. UnloadDriver; 5.3. QueryDriverInformation (e.g., checking if the driver is certified by an accredited source such as accredited manufacturers); 5.4. DumpDriverMemory; 5.5. UploadDriverBinary.

In some embodiments, the other operations may include but are not limited to the following atomic actions: 6.1. Shutdown callback; 6.2. ProcessCreation callback; 6.3. ObjectOperations callback; 6.4. LoadImage callback; 6.5. CmRegistry callback; 6.6. IOCTL_IP_SET_FIREWALL_HOOK network callback; 6.7. Kernel-mode thread suspend and resume operation; 6.8. Kernel object directory operation (e.g., the \Device and \Driver kernel object directory); 6.9. System Service Dispatch Table (SSDT) handlers hooking; 6.10. SYSENTER handler hooking (e.g., nt!KiFastCallEntry routine); 6.11. Driver object dispatch routines hooking; 6.12. Driver StartIO routines hooking; 6.13. ObjectManger routines hooking; 6.14. Registry CellRoutine hooking; 6.15. Kernel inline hooking; 6.16. Microsoft and third parties drivers inline hooking; 6.17. Kernel module Import Address Table (IAT) and Export Address Table (EAT) hooking; 6.18. Upper and lower filter drivers operation; 6.19. SymbolicLink enumeration; 6.20. Boot-0 Rootkit removal driver (e.g., a stand-alone Windows Boot-0 kernel driver for deleting rootkit files during the Boot-0 startup phase).

In some embodiments, each of the above atomic actions may be disassembled into at least four sub-actions. For example, the 6.1. Shutdown callback may be disassembled into: 6.1.1. Enumerate all shutdown callback handlers; 6.1.2. Clear all shutdown callback handlers; 6.1.3. Enumerate a specified shutdown callback handler; 6.1.4. Clear a specified shutdown callback handler. For another example, the 6.18. Upper and lower filter drivers operation may be disassembled into: 6.18.1. Enumerate all upper filter drivers for a specific target; 6.18.2. Enumerate all lower filter drivers for a specific target; 6.18.3. Clear all upper filter drivers for a specific target; 6.18.4. Clear all lower filter drivers for a specific target; 6.18.5. Enumerate a specified upper filter driver for a specific target; 6.18.6. Enumerate a specified lower filter driver for a specific target; 6.18.7. Clear a specified upper filter driver for a specific target; 6.18.8. Clear a specified lower filter driver for a specific target.

In some embodiments, different selection and combination of the rules may be used to detect and/or remove different rootkits. For example, the disclosed systems may detect and clean up an open-source rootkit named zwhawk by dispatching rules: 2.4 and 5.2. For another example, the disclosed systems may detect and clean up an open-source rootkit named kmd_rootkit by dispatching rules 1.6, 2.4, 3.5, 6.9, and 5.2. For another example, the disclosed systems may detect and clean up a closed-source rootkit named heng_pro by dispatching rules 2.4, 5.4, 6.9, and 5.2. For another example, the disclosed systems may detect and clean up a closed-source rootkit named grayfish by dispatching rules 5.4, 6.8, 6.11, 6.15, 6.16, and 6.20. Exemplary pseudo code for rootkit grayfish detection is as follows:

```
IF function dump_driver_memory returns success (zero) AND returned
memory data matches malicious signatures
    IF function kernel_object_directory_enumeration returns success AND
    returned kernel object directory data matches malicious directory
    signatures
        IF function driver_object_dispatch_hook_detection returns TRUE
        (detected)
            IF function os_kernel_inline_hook_detection returns TRUE
            (detected)
                IF function third_party_drivers_inline_hook_detection returns
                TRUE (detected)
                    set the grayfish_rootkit_detected flag to TRUE
                    write trace data to event log
                    return success, ROOTKIT_DETECTED
                    AND THEN
                    upload Rootkit binaries if necessary
                    download and execute grayfish_rootkit_removal rules
                    write trace data to event log
                    inform the end user
                ELSE
                    write trace data to event log
                    return failure - an error code defined by function
third_party_drivers_inline_hook_detection, such as DISK_ERROR
                    or return success, NO_ROOTKIT_DETECTED
            ELSE
                write trace data to event log
                return failure - an error code defined by function os
kernel_inline_ hook_detection, such as IO_ERROR
                or return success, NO_ROOTKIT_DETECTED
        ELSE
            write trace data to event log
            return failure - an error code defined by function
driver_object_dispatch_hook_detection, such as TRY_AGAIN
            or return success, NO_ROOTKIT_DETECTED
    ELSE
        write trace data to event log
        return failure - an error code defined by function
kernel_object_directory_enumeration, such as NO_SUCH_DEVICE
        or return success, NO_ROOTKIT_DETECTED
ELSE
    write trace data to event log
    return failure (a non-zero value) - an error code defined by
function dump_driver_memory, such as NO_MEMORY
    or return success, NO_ROOTKIT_DETECTED
```

Exemplary pseudo code for rootkit grayfish removal is as follows:

```
IF function kernel_object_directory_removal returns success (zero) AND
    function os_kernel_inline_hook_removal returns success AND
    function third_party_drivers_inline_hook_removal returns success AND
    function boot-0_rootkit_removal returns success
        set the grayfish_rootkit_deleted flag to TRUE
        write trace data to event log
        return success, ROOTKIT_DELETED
        AND THEN
        inform the end user
        reboot the operating system if necessary
ELSE
    write trace data to event log
    retry
```

The grayfish detection and removal pseudo code may embody contents packed into one or more computer programs executable at the endpoint computing device to detect and/or remove grayfish. The various functions in the grayfish detection and removal pseudo code may correspond to the various rules provided above and underlying atomic operations, the specific organization and execution of which may detect and/or remove grayfish.

The above provides mere examples. In some embodiments, the rules and atomic operations may differ from operating systems, because, for example, some concepts like registry are unique to certain operating systems.

Figure 3:
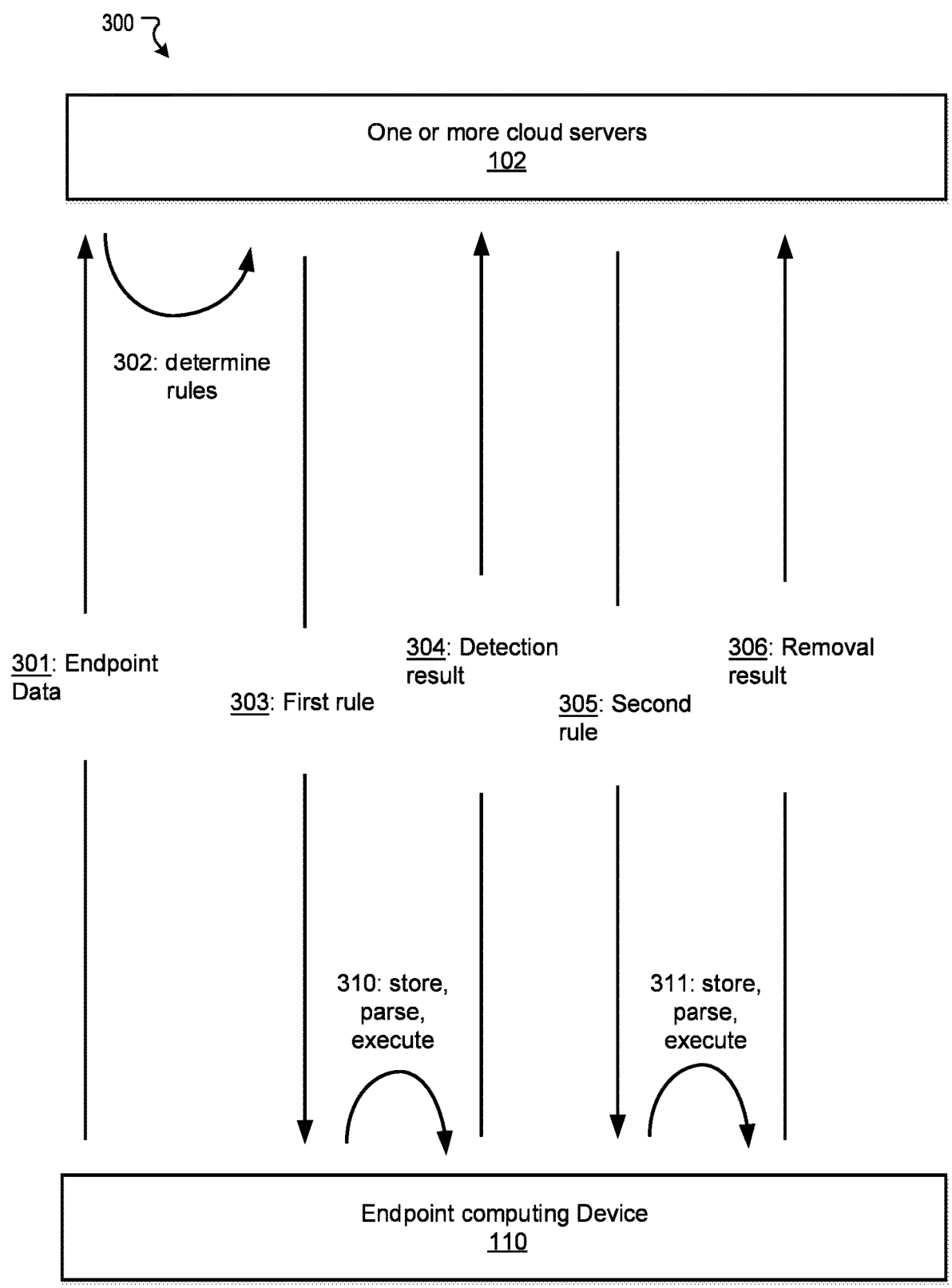
FIG. 3 illustrates a flowchart of an exemplary method for detecting and/or removing rootkit, in accordance with various embodiments.

FIG. 3 illustrates a flowchart of an exemplary method 300 for detecting and/or removing rootkit, in accordance with various embodiments. The method 300 may include steps described below, one or more of which may be optional.

In some embodiments, at step 301, one or more cloud servers 112 may obtain endpoint data of an endpoint computing device 110. The endpoint data may be obtained in real-time or after-time (e.g., if obtaining in real-time may be unsafe). To obtain the endpoint data, the cloud server may actively fetch the data from the endpoint computing device or passively receive the data from the endpoint computing device. For example, the cloud server may push a data collection program to the endpoint computing device to collect the endpoint data. For another example, the endpoint computing device 110 may transmit the endpoint data to one or more cloud servers. The endpoint data may include many types and may be used to determine target rootkit suspects. In one embodiment, the endpoint data may include one or more of: a driver binary file of a driver of the endpoint computing device (e.g., to check whether the file is certified by an accredited source such as accredited manufacturers); information of a process of the endpoint computing device (e.g., to check if the process is doing anything suspicious); a version of a driver of the endpoint computing device (e.g., to check if the driver is outdated or has certain vulnerability); and a version of an operating system of the endpoint computing device (e.g., to check if the operating system is outdated or has certain vulnerability). The word "endpoint" is to differentiate computing devices off the cloud from computing devices of the cloud, and does not limit the type of computing device.

In some embodiments, at step 302, the one or more cloud servers 102 may determine a target rootkit based on the endpoint data (e.g., based on a few condition checkpoints such as whether a file operation and a registry indicate potential rootkit infection); select, from multiple rules (e.g., multiple script-language rules) stored in a cloud database (e.g., the data store), the plurality of script-language rules; and generate a computer program based on the target rootkit. At step 302, based on the endpoint data, the one or more cloud servers 102 may determine a plurality of script-language rules. A scripting language is a programming language that is interpreted, meaning it is translated into machine code when the code is run rather than beforehand. JavaScript, Python, and Ruby are examples of scripting languages. Each of the plurality of script-language rules may correspond to an atomic operation of detecting and/or removing at least one rootkit, the at least one rootkit may include a target rootkit, and the plurality of script-language rules may include a set of one or more rootkit rules corresponding to the target rootkit. The set of rootkit rules comprises the computer program, and the computer program is configured to trigger the corresponding atomic operation for each of the set of rootkit rules.

At steps 303-306, the one or more cloud servers 102 may transmit, to the endpoint computing device 110, the plurality of script-language rules (e.g., including a script comprising the pseudo code above), wherein the set of rootkit rules is executable at the endpoint computing device to detect and/or remove the target rootkit by, for each of the set of rootkit rules, executing a corresponding atomic operation. Atomic operations in concurrent programming are program operations that run completely independently of any other processes nothing (including rootkits) can affect the execution of an atomic operation.

In some embodiments, a script comprises different portions of codes may be pushed to a plurality of endpoint computing devices. The different portions may be tailored to detecting and/or removing different rootkits (e.g., preceded by conditional language for triggering the different portions). Different endpoint computing devices may trigger corresponding portions depending on their needs, for example, based on their endpoint data.

In another word, the endpoint computing device 110 may receive, from the one or more cloud servers, the script-language rules such as the rootkit rules. To receive the plurality of script-language rules, the endpoint computing device 110 may actively download the data from the cloud, or passively receive data pushed from the cloud. Each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit. The rootkit rules may be in script-language.

In some embodiments, selected rootkit rules from the plurality of script-language rules may form different combinations to detect and/or remove different rootkits. In one embodiment, the at least one rootkit comprises a different target rootkit, and the plurality of script-language rules comprise a different set of one or more rootkit rules corresponding to the different target rootkit. The different set of rootkit rules is executable at the endpoint computing device to detect and/or remove the different target rootkit by, for each of the different set of rootkit rules, executing a corresponding atomic operation. In another word, the endpoint computing device 110 may receive, from the one or more cloud servers, the different set of rootkit rules; and execute, at the endpoint computing device, the different set of rootkit rules to detect and/or remove the different target rootkit by, for each of the different set of rootkit rules, executing a corresponding atomic operation. In one embodiment, the endpoint computing device 110 may store the set of one or more rootkit rules to a driver module of the endpoint computing device. The driver module corresponds to a hardware abstraction layer that has a privilege level no lower than a privilege level of the target rootkit.

In some embodiments, the plurality of script-language rules may include one or more first rules for detecting the target rootkit and one or more second rules for removing the target rootkit. At step 303, the one or more cloud servers 102 may transmit the one or more first rules (e.g., including a corresponding first computer program, including a general computer program that corresponds to both first and second rules) to the endpoint computing device 110. At step 310, the endpoint computing device 110 may parse and store the one or more first rules, parse the first rules, and detect the target rootkit by executing the first rules. At step 304, the one or more cloud servers 102 may obtain, from the endpoint computing device 110, a positive result of detecting the target rootkit in the endpoint computing device 110. At step 305, the one or more cloud servers 102 may transmit the one or more second rules (e.g., including a corresponding second computer program) to the endpoint computing device 110. At step 311, the endpoint computing device 110 may parse and store the one or more second rules, and detect the target rootkit by executing the second rules. The execution of the first and second rules triggers first and second rule handlers (e.g., handlers integrated at the endpoint computing device such as 251 and 261 described above) corresponding to the first and second rule handlers to execute a plurality of atomic operations respectively corresponding to the first and second rules. At step 306, the one or more cloud servers 102 may receive a message of successful removal of the target rootkit from the endpoint computing device 110.

The endpoint computing device 110 may execute the set of rootkit rules to detect and/or remove the target rootkit by, for each of the set of rootkit rules, executing a corresponding atomic operation. In one embodiment, the endpoint computing device 110 may receive, from the one or more cloud servers, the one or more first rules; execute the one or more first rules to detect the target rootkit by, for each of the one or more first rules, executing a corresponding atomic operation; transmit, to the one or more cloud servers, a positive result indicating detection of the target rootkit; receive, from the one or more cloud servers, the one or more second rules; and execute the one or more second rules to remove the target rootkit by, for each of the one or more second rules, executing a corresponding atomic operation.

In some embodiments, the one or more cloud servers 102 may transmit the set of rootkit rules to a driver module (e.g., kernel-mode driver 292) of the endpoint computing device 110, and the driver module corresponds to a hardware abstraction layer that has a privilege level no lower than a privilege level of the target rootkit. For example, both the driver module and the target rootkit are at Ring 0. For another example, the driver module is at Ring 0, and the target rootkit is at Ring 1 or Ring 2 (Ring 1 and Ring 2 have system privileges). In one embodiment, the hardware abstraction layer is a kernel-mode driver or a hypervisor handler.

In some embodiments, to counter new evolvement in the target rootkit, the rootkit rules may be updated. For example, the one or more cloud servers 102 may transmit an updated rootkit rule to the endpoint computing device 110 to update one of the set of rootkit rules. The set of rootkit rules is executable at the endpoint computing device to detect and/or remove the target rootkit by, for each of the set of rootkit rules including the updated rootkit rule, executing a corresponding atomic operation. Similarly, new rules may be added and existing rules may be updated to counter new target rootkits.

In one embodiment, the endpoint computing device 110 may include a vehicle-based computing device and a Controlled Area Network (CAN-bus) coupled to the vehicle-based computing device as described above with reference to FIG. 2. The endpoint data may include CAN-bus data. The atomic operation of detecting and/or removing the at least one rootkit may include an atomic operation of detecting whether the target rootkit has access to the CAN-bus. The set of one or more rootkit rules may be executable to detect whether the target rootkit has access to the CAN-bus based on the CAN-bus data or to block the access or to remove the rootkit. In one example, CAN-bus data may include various signal transmissions such as 111: start engine; 222: signal left turn, 333: open trunk, 444: sending data to a roadside data collector, etc. Monitoring the CAN-bus data may provide evidence of whether a rootkit can give out such signal or otherwise has access, which may be a dangerous sign because of the possibility of rootkit hijacking the vehicle. Detecting such rootkit may allow removal before causing serious damage.

In one embodiment, the endpoint computing device 110 may include a vehicle-based computing device and an infotainment system coupled to the vehicle-based computing device as described above with reference to FIG. 2. The endpoint data may include infotainment data. The set of one or more rootkit rules may be executable to detect whether the target rootkit has access to the infotainment system based on the infotainment data or to block the access or to remove the rootkit. In one example, infotainment data may include various signal transmissions such as 777: play music; 888: capture voice from microphone, etc. Monitoring the infotainment data may provide evidence of whether a rootkit can give out such signal or otherwise has access. Detecting such rootkit may allow removal before causing serious damage.

In one embodiment, the endpoint computing device may include a vehicle-based computing device and a telematics box coupled to the vehicle-based computing device as described above with reference to FIG. 2. The endpoint data may include telematics data. The set of one or more rootkit rules may be executable to detect whether the target rootkit has access to the telematics box based on the telematics data or to block the access or to remove the rootkit. In one example, telematics data may include various signal transmissions such as 555: collect speed; 666: receive instruction from an outside source, etc. Monitoring the telematics data may provide evidence of whether a rootkit can give out such signal or otherwise has access. Detecting such rootkit may allow removal before causing serious damage.

FIG. 4A illustrates a flowchart of an exemplary method 410 for detecting and/or removing rootkit, according to various embodiments of the present disclosure. The method 410 may be implemented in various environments including, for example, the environment 100 of FIG. 1. The exemplary method 410 may be implemented by one or more components of the computing system 190 (e.g., the one or more servers). For example, a non-transitory computer-readable storage medium (e.g., the memory 106) may store instructions that, when executed by a processor (e.g., the processor 104), cause the server 102a (e.g., the processor 104) to perform the method 410. The operations of method 410 presented below are intended to be illustrative. Depending on the implementation, the exemplary method 410 may include additional, fewer, or alternative steps performed in various orders or in parallel.

Block 412 includes obtaining, at one or more cloud servers, endpoint data of an endpoint computing device. Block 414 includes, based on the endpoint data, determining, by the one or more cloud servers, a plurality of script-language rules, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit. Block 416 includes transmitting, by the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation.

FIG. 4B illustrates a flowchart of an exemplary method 420 for detecting and/or removing rootkit, according to various embodiments of the present disclosure. The method 420 may be implemented in various environments including, for example, the environment 100 of FIG. 1. The exemplary method 420 may be implemented by one or more components of the computing device (e.g., computing device 110, 111, 112). For example, a non-transitory computer-readable storage medium (e.g., the memory 116) may store instructions that, when executed by a processor (e.g., the processor 114), cause the computing device 110 (e.g., the processor 114) to perform the method 420. The operations of method 420 presented below are intended to be illustrative. Depending on the implementation, the exemplary method 420 may include additional, fewer, or alternative steps performed in various orders or in parallel.

Block 422 includes transmitting, by an endpoint computing device, endpoint data to one or more cloud servers. Block 424 includes receiving, at the endpoint computing device from the one or more cloud servers, a plurality of script-language rules corresponding to the endpoint data, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit. Block 426 includes executing, at the endpoint computing device, the set of rootkit rules to detect and/or remove the target rootkit by, for each of the set of rootkit rules, executing a corresponding atomic operation.

Figure 5A:
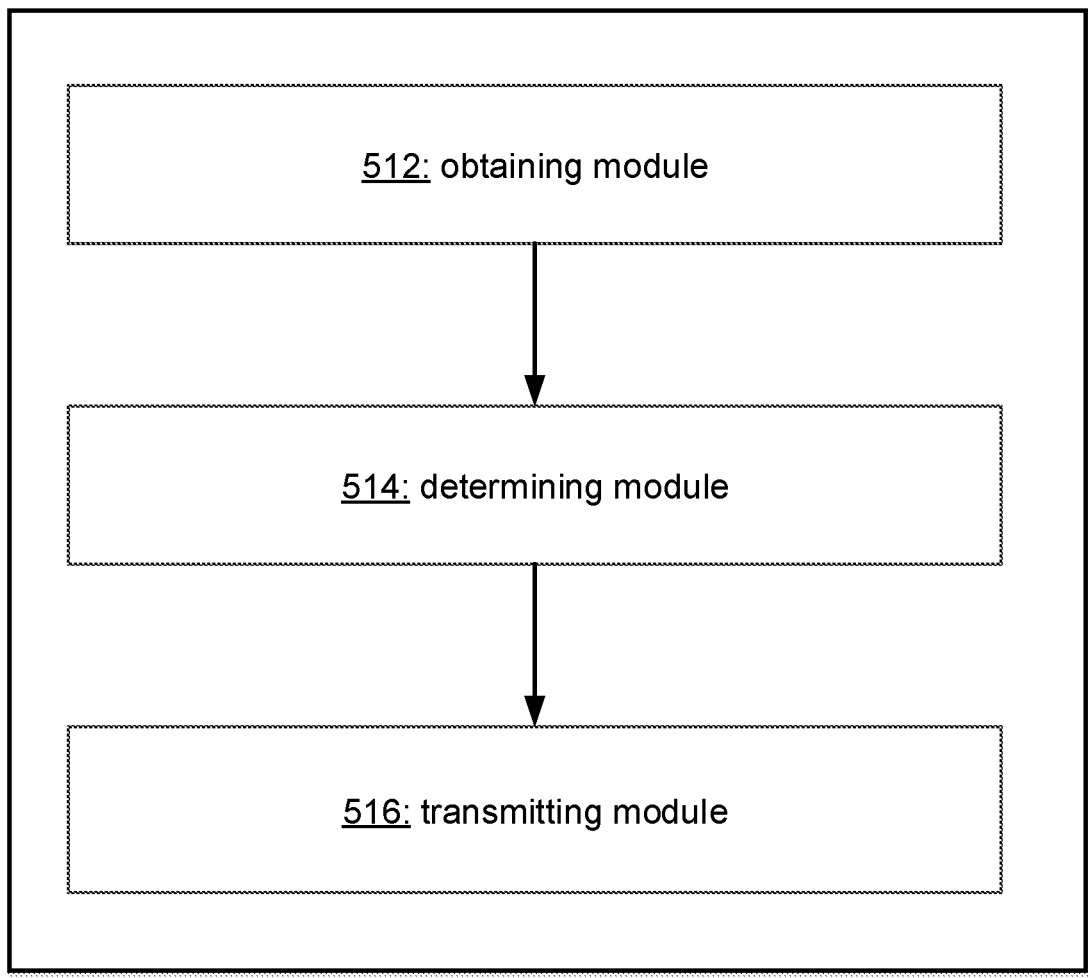
FIG. 5A illustrates an exemplary system for detecting and/or removing rootkit, in accordance with various embodiments.

FIG. 5A illustrates a block diagram of an exemplary computer system 510 for detecting and/or removing rootkit, in accordance with various embodiments. The system 510 may be an exemplary implementation of the computing system 190 of FIG. 1 or one or more similar devices. The method 410 may be implemented by the computer system 510. The computer system 510 may include one or more processors and one or more non-transitory computer-readable storage media (e.g., one or more memories) coupled to the one or more processors and configured with instructions executable by the one or more processors to cause the system or device (e.g., the processor) to perform the method 410. The computer system 510 may include various units/modules corresponding to the instructions (e.g., software instructions).

In some embodiments, the computer system 510 may include an obtaining module 512 configured to obtain, at one or more cloud servers, endpoint data of an endpoint computing device; a determining module 514 configured to, based on the endpoint data, determine, at the one or more cloud servers, a plurality of script-language rules, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and a transmitting module 516 configured to transmit, at the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation.

Figure 5B:
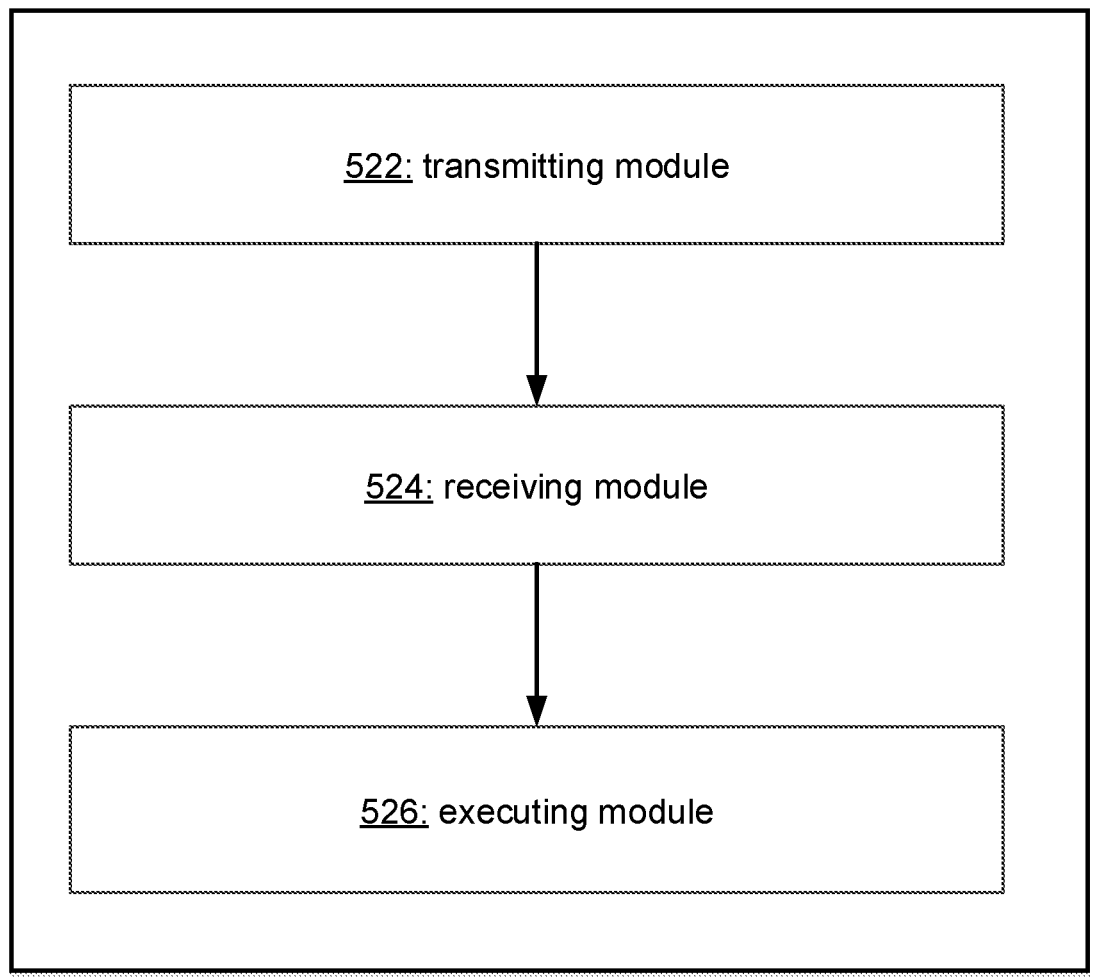
FIG. 5B illustrates an exemplary system for detecting and/or removing rootkit, in accordance with various embodiments.

FIG. 5B illustrates a block diagram of an exemplary computer system 520 for detecting and/or removing rootkit, in accordance with various embodiments. The system 520 may be an exemplary implementation of the computing device (e.g., 110, 111, 112) of FIG. 1 or one or more similar devices. The method 420 may be implemented by the computer system 520. The computer system 520 may include one or more processors and one or more non-transitory computer-readable storage media (e.g., one or more memories) coupled to the one or more processors and configured with instructions executable by the one or more processors to cause the system or device (e.g., the processor) to perform the method 420. The computer system 520 may include various units/modules corresponding to the instructions (e.g., software instructions).

In some embodiments, the computer system 520 may include a transmitting module 522 configured to transmit, at an endpoint computing device, endpoint data to one or more cloud servers; a receiving module 524 configured to receive, at the endpoint computing device from the one or more cloud servers, a plurality of script-language rules corresponding to the endpoint data, wherein: each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and an executing module 526 configured to execute, at the endpoint computing device, the set of rootkit rules to detect and/or remove the target rootkit by, for each of the set of rootkit rules, executing a corresponding atomic operation.

Figure 6:
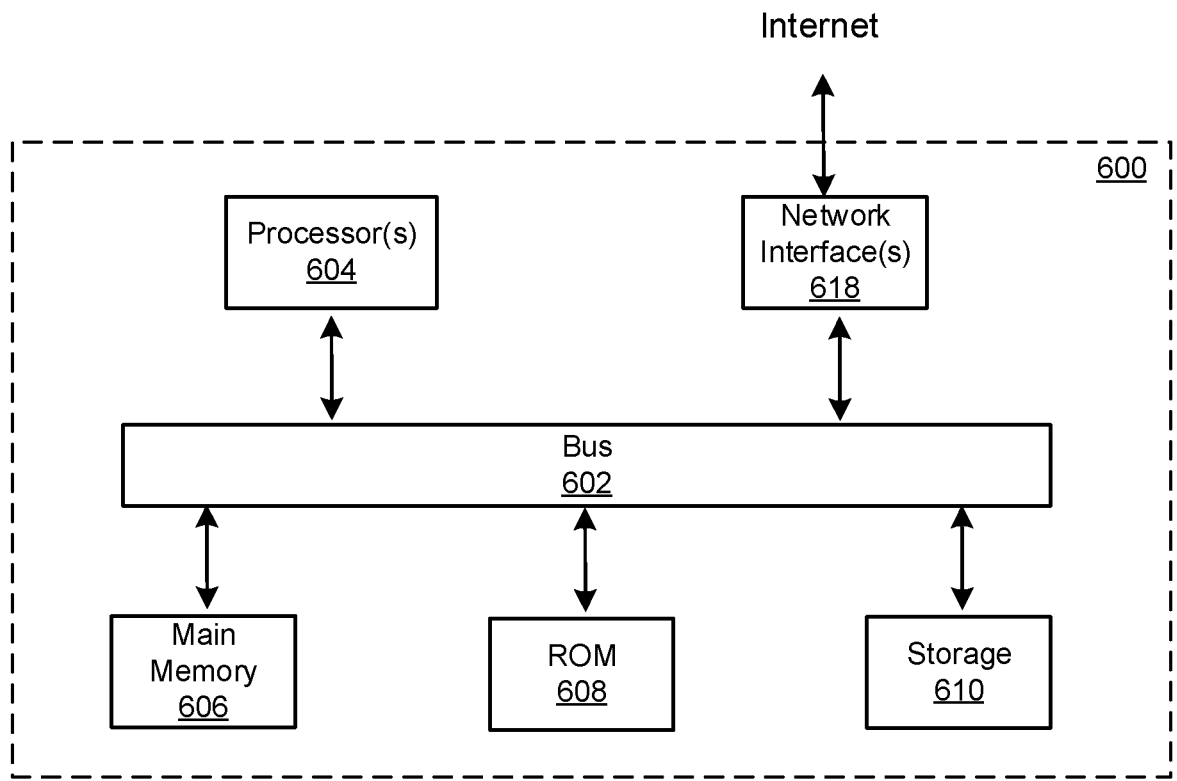
FIG. 6 illustrates a block diagram of an exemplary computer system in which any of the embodiments described herein may be implemented.

FIG. 6 is a block diagram that illustrates a computer system 600 upon which any of the embodiments described herein may be implemented. The system 600 may correspond to the computing device 110, 111, 112 or the computing system 190 described above. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The main memory 606, the ROM 608, and/or the storage 610 may include non-transitory storage media. The term "non-transitory media," and similar terms, as used herein refers to a media that store data and/or instructions that cause a machine to operate in a specific fashion. The media excludes transitory signals. Such non-transitory media may include non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 also includes a network interface 618 coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

The computer system 600 can send messages and receive data, including program code, through the network(s), network link and network interface 618. In the Internet example, a server might transmit a requested code for an application program through the Internet, the ISP, the local network and the network interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors including computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm (e.g., the computer program). The algorithm may be included in program codes or instructions stored in a memory (e.g., a non-transitory computer-readable storage medium described above). Such algorithm may include a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
   obtaining, at one or more cloud servers, endpoint data of an endpoint computing device;
   based on the endpoint data, determining, by the one or more cloud servers, a plurality of script-language rules, wherein:
      each of the plurality of script-language rules corresponds to an atomic operation of detecting and/or removing at least one rootkit,
      the at least one rootkit comprises a target rootkit, and
      the plurality of script-language rules comprise a set of one or more rootkit rules corresponding to the target rootkit; and
   transmitting, by the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation.

2. The method of claim 1, wherein the endpoint data comprises one or more of:
   a driver binary file of a driver of the endpoint computing device;
   information of a process of the endpoint computing device;
   a version of a driver of the endpoint computing device; and
   a version of an operating system of the endpoint computing device.

3. The method of claim 1, wherein:
   the at least one rootkit comprises a different target rootkit;
   the plurality of script-language rules comprise a different set of one or more rootkit rules corresponding to the different target rootkit; and
   the different set of rootkit rules is executable at the endpoint computing device to detect and/or remove the different target rootkit by, for each of the different set of rootkit rules, executing a corresponding atomic operation.

4. The method of claim 1, wherein:
   the set of rootkit rules comprises one or more first rules for detecting the target rootkit and one or more second rules for removing the target rootkit;
   transmitting, by the one or more cloud servers to the endpoint computing device, the plurality of script-language rules comprises:
      transmitting, by the one or more cloud servers, the one or more first rules to the endpoint computing device, obtaining, by the one or more cloud servers from the endpoint computing device, a positive result of detecting the target rootkit in the endpoint computing device, and transmitting, by the one or more cloud servers, the one or more second rules to the endpoint computing device; and the method further comprises receiving, at the one or more cloud servers, a message of successful removal of the target rootkit from the endpoint computing device.

5. The method of claim 4, further comprising:

storing, at the endpoint computing device, the first and second rules;

parsing, at the endpoint computing device, the first and second rules; and detecting and removing, at the endpoint computing device, the target rootkit by executing the first and second rules, wherein the execution of the first and second rules triggers first and second rule handlers corresponding to the first and second rules to execute a plurality of atomic operations respectively corresponding to the first and second rules.

6. The method of claim 1, wherein transmitting the plurality of script-language rules comprises:

transmitting, by the one or more cloud servers, the plurality of script-language rules to a driver module of the endpoint computing device, wherein the driver module corresponds to a hardware abstraction layer that has a privilege level no lower than a privilege level of the target rootkit.

7. The method of claim 6, wherein the hardware abstraction layer is a kernel-mode driver or a hypervisor handler.

8. The method of claim 1, further comprising transmitting, by the one or more cloud servers, an updated rootkit rule to the endpoint computing device to obtain an updated set of rootkit rules by updating at least one of the set of rootkit rules, wherein the updated set of rootkit rules is executable at the endpoint computing device to detect and/or remove the target rootkit by, for each of the updated set of rootkit rules, executing a corresponding atomic operation.

9. The method of claim 1, further comprising:

determining, by the one or more cloud servers, the target rootkit based on the endpoint data;

selecting, by the one or more cloud servers from multiple rules stored in a cloud database, the plurality of script-language rules; and generating, by the one or more cloud servers, a computer program based on the target rootkit, wherein the set of rootkit rules comprises the computer program, and the computer program is configured to trigger the corresponding atomic operation for each of the set of rootkit rules.

10. The method of claim 1, wherein:

the endpoint computing device comprises a vehicle-based computing device and a Controlled Area Network (CAN-bus) coupled to the vehicle-based computing device;

the endpoint data comprises CAN-bus data; and the atomic operation of detecting and/or removing the at least one rootkit comprises an atomic operation of detecting whether the target rootkit has access to the CAN-bus.

11. The method of claim 1, wherein:

the endpoint computing device comprises a vehicle-based computing device and a Controlled Area Network (CAN-bus) coupled to the vehicle-based computing device;

the endpoint data comprises CAN-bus data; and the set of rootkit rules is executable to detect whether the target rootkit has access to the CAN-bus based on the CAN-bus data or to block the access.

12. The method of claim 1, wherein:

the endpoint computing device comprises a vehicle-based computing device and an infotainment system coupled to the vehicle-based computing device;

the endpoint data comprises infotainment data; and the set of rootkit rules is executable to detect whether the target rootkit has access to the infotainment system based on the infotainment data or to block the access.

13. The method of claim 1, wherein:

the endpoint computing device comprises a vehicle-based computing device and a telematics box coupled to the vehicle-based computing device;

the endpoint data comprises telematics data; and the set of rootkit rules is executable to detect whether the target rootkit has access to the telematics box based on the telematics data or to block the access.

14. A non-transitory computer-readable storage medium storing instructions executable by one or more processors, wherein execution of the instructions causes the one or more processors to perform operations comprising:

obtaining, at one or more cloud servers, endpoint data of an endpoint computing device;

based on the endpoint data, determining, by the one or more cloud servers, a plurality of script-language rules, wherein:

each of the plurality of script-language rules corresponds to an atomic operation of detecting and/or removing at least one rootkit, the at least one rootkit comprises a target rootkit, and the plurality of script-language rules comprise a set of one or more rootkit rules corresponding to the target rootkit; and transmitting, by the one or more cloud servers to the endpoint computing device, the plurality of script-language rules, wherein the set of rootkit rules is executable at the endpoint computing device to detect and/or remove the target rootkit by, for each of the set of rootkit rules, executing a corresponding atomic operation.

15. The non-transitory computer-readable storage medium of claim 14, wherein the endpoint data comprises one or more of:

a driver binary file of a driver of the endpoint computing device;

information of a process of the endpoint computing device;

a version of a driver of the endpoint computing device; and a version of an operating system of the endpoint computing device.

16. The non-transitory computer-readable storage medium of claim 14, wherein:

the at least one rootkit comprises a different target rootkit;

the plurality of script-language rules comprise a different set of one or more rootkit rules corresponding to the different target rootkit; and the different set of rootkit rules is executable at the endpoint computing device to detect and/or remove the different target rootkit by, for each of the different set of rootkit rules, executing a corresponding atomic operation.

17. The non-transitory computer-readable storage medium of claim 14, wherein:

the set of rootkit rules comprises one or more first rules for detecting the target rootkit and one or more second rules for removing the target rootkit;
transmitting, by the one or more cloud servers to the endpoint computing device, the plurality of script-language rules comprises:
transmitting, by the one or more cloud servers, the one or more first rules to the endpoint computing device,
obtaining, by the one or more cloud servers from the endpoint computing device, a positive result of detecting the target rootkit in the endpoint computing device, and
transmitting, by the one or more cloud servers, the one or more second rules to the endpoint computing device; and
the operations further comprise receiving, at the one or more cloud servers, a message of successful removal of the target rootkit from the endpoint computing device.

18. The non-transitory computer-readable storage medium of claim 17, wherein the operations further comprise:
storing, at the endpoint computing device, the first and second rules;
parsing, at the endpoint computing device, the first and second rules; and
detecting and removing, at the endpoint computing device, the target rootkit by executing the first and second rules, wherein the execution of the first and second rules triggers first and second rule handlers corresponding to the first and second rules to execute a plurality of atomic operations respectively corresponding to the first and second rules.

19. The non-transitory computer-readable storage medium of claim 14, wherein transmitting the plurality of script-language rules comprises:
transmitting, by the one or more cloud servers, the set of rootkit rules to a driver module of the endpoint computing device, wherein the driver module corresponds to a hardware abstraction layer that has a privilege level no lower than a privilege level of the target rootkit.

20. A computer-implemented method, comprising:
transmitting, by an endpoint computing device, endpoint data to one or more cloud servers;
receiving, at the endpoint computing device from the one or more cloud servers, a plurality of script-language rules corresponding to the endpoint data, wherein:
each of the plurality of script-language rules corresponds to an atomic operation of detecting and/or removing at least one rootkit,
the at least one rootkit comprises a target rootkit, and
the plurality of script-language rules comprise a set of one or more rootkit rules corresponding to the target rootkit; and
executing, at the endpoint computing device, the set of rootkit rules to detect and/or remove the target rootkit by, for each of the set of rootkit rules, executing a corresponding atomic operation.

\* \* \* \* \*